Figure 1:
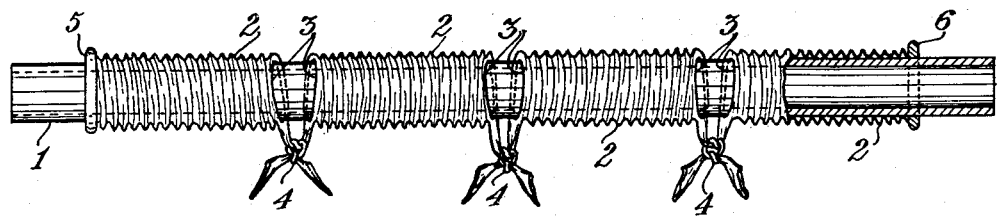

Dec. 5, 1933.   F. FRIEDLER   1,938,070

PREPARATION OF SAUSAGE CASINGS FOR STUFFING

Filed Aug. 20, 1932

Fritz Friedler
INVENTOR:

By
 his Attorney.

Patented Dec. 5, 1933

1,938,070

UNITED STATES PATENT OFFICE 1,938,070

PREPARATION OF SAUSAGE CASINGS FOR STUFFING

Fritz Friedler, Vienna, Austria

Application August 20, 1932, Serial No. 629,579, and in Austria February 14, 1931

4 Claims. (Cl. 17—45)

I have filed applications in Austria, February 14, 1931, and August 9, 1932, and in Germany February 25, 1931.

This invention relates to a method and apparatus for preparing sausage casings for stuffing.

Animal casings for the manufacture of sausages are brought on the market in preserved condition and have to be freed from the salt used for preserving, prior to their being placed on the stuffer horn of a stuffing machine. For this purpose the bundles containing a plurality of casings, say four or five, are loosened and the individual casings put into water, remaining therein until all the salt has been dissolved. Each individual casing is then shirred on the nozzle of a stuffing machine and the stuffing is forced into the casing. Shirring the casings on the nozzle is a very troublesome operation and requires much time as the casings become rather slippery after having been soaked in water.

An object of the present invention is to facilitate this shirring operation. For this purpose a plurality of raw casings is shirred on a common mandrel in such a manner that a hole is torn in the casing wall near the ends of each casing, through which the mandrel is passed, whereupon the downhanging end portions of adjacent casings are connected together, e. g., by knotting.

The shirred casings constituting one continuous casing unit are preserved in the usual manner, for instance, with salt, and are again made supple in water prior to their being stuffed. In order readily to transfer the unit of casings on to the stuffer horn of the stuffing machine it is necessary to bring the mandrel having approximately the same diameter as the stuffer horn into alinement with the latter. All the shirred casings can then be brought on to the stuffer horn by one sliding movement and be stuffed in one operation, since they are all connected with one another.

If the unit of casings shirred on a mandrel is very long, difficulties may arise in soaking the casings since the water cannot penetrate between the wrinkles of the casings. According to a further object of the invention this drawback is removed in that the united casings are shirred under water on an auxiliary mandrel adapted to be mounted to the stuffer horn of the sausage stuffing machine, the casings being thus separately unwrinkled and the water allowed to contact all portions of the casings.

A special apparatus is used for shirring the casings under water, which consists of a receptacle with pins provided on opposite walls thereof. The one pin is adapted to carry the auxiliary mandrel and the other which is hollow and provided with inlets for water, is arranged to support the hollow main mandrel.

Other objects of the invention will be more fully understood by reference to the accompanying drawing, wherein—

Figure 2:
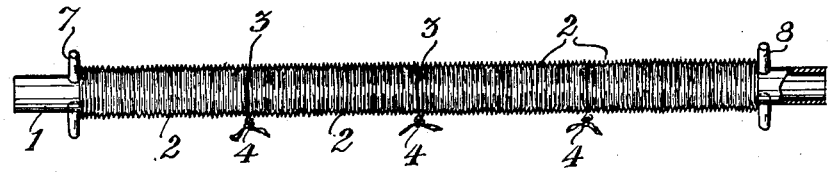
Figure 3:
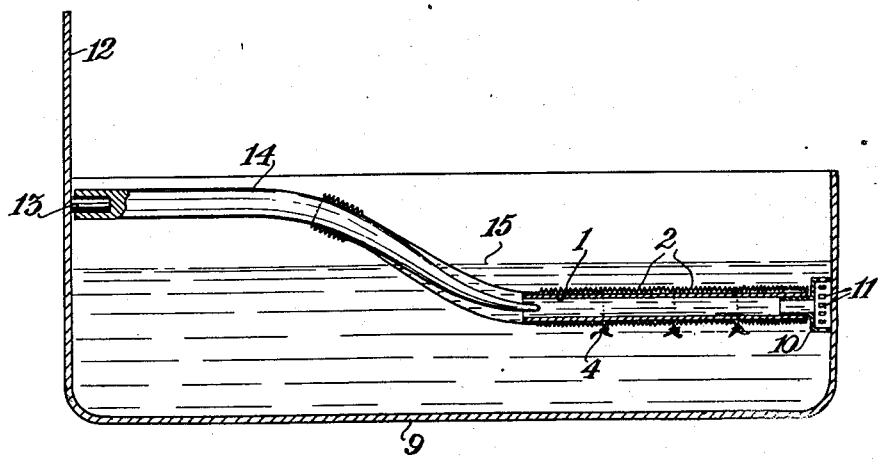

Fig. 1 is a view partly in section illustrating a mandrel with casings shirred thereon; Fig. 2 is a view partly in section of an alternative embodiment according to the invention, and Fig. 3 is a sectional view through an apparatus for shirring the casings from the main mandrel on to an auxiliary mandrel.

Referring to the drawing, 1 denotes a mandrel, preferably made hollow, having shirred thereon casings 2 in such a manner that holes 3 are torn in the walls of the casings near the ends thereof and the mandrel 1 is passed through them. The end portions of the casings which are thus not shirred but hanging down from the mandrel are connected together, for instance, by knots 4. Retainer rings 5 and 6 are provided at the ends of the mandrel 1 to confine the casings 2 on the mandrel 1. When the casings are to be used they are put into water to become free from the preserving salt, and are then brought on the stuffer horn. The internal diameter of the mandrel or tube 1 is slightly larger than the outer diameter of the stuffer horn on the stuffing machine so that the tube 1 can be mounted on the stuffer horn and all the casings be slid in one movement thereon. The casings are then stuffed and treated like one single piece.

In Fig. 1 the casings are shown spaced from one another to allow a more clear illustration of how to shirr the casings and to connect them with one another. Fig. 2, however, shows the casings as they are actually shirred on a mandrel.

According to Fig. 2 the tube 1 is provided with retainer pins 7, 8 which are fixed in transversal bores at the ends of the tube 1 and adapted to confine the shirred casings 2 between them.

The total length of the individual casings shirred on a mandrel may amount to or over twenty meters, it making almost no difference whether the individual casings are long or short.

In case the shirred casings are of a great length soaking cannot be effected properly since the wrinkles of the casings are so close beside one another that the water cannot penetrate between them. Effectively soaking such shirred casings prior to their being stuffed is ensured by an apparatus as shown in Fig. 3, which consists of a water tank 9 on one side wall of which there is secured a graduated hollow pin 10 with inlets 11 for water, and on the opposite side wall, which is continued upwardly by a shield 12, there is arranged a pin 13 upon which is mounted the auxiliary mandrel 14 of curved shape. The tapered end of the mandrel enters the bore of the hollow main mandrel 1 fixed on the pin 10. The united casings 2 are shirred from the main mandrel 1 on the auxiliary mandrel 14 and thus unwrinkled successively so that all portions of the casings come into contact with water.

The curved mandrel 14 is so arranged as to lie partially above the level 15 of the water so that shirring has not to be done under water. The diameter of the auxiliary mandrel is slightly larger than the diameter of the stuffer horn so as readily to allow transferring the united casings on to the latter.

The foregoing detailed description has been given for clearness of understanding only, it being understood that changes in the embodiment of the invention herein disclosed may be made as will fall within the scope of the appended claims without departing from the spirit of the invention.

It is to be understood that for instance the storage mandrel may be made of any suitable material, e. g., instead of a rigid mandrel as described sausage casings themselves may be used to serve the purpose of a storage mandrel.

I claim:

1. The method of preparing sausage casings for stuffing, which consists in tearing a hole in the wall of a casing near one end thereof, shirring the casing through its other end on a mandrel and passing the mandrel through said hole of the casing wall, the end portion of the casing hanging thus down from the mandrel, tearing a hole in the wall of another casing near each end thereof, shirring the casing through said holes on the mandrel, the end portions of the casings hanging thus down from the mandrel, tearing holes in the ends of further casings desired to be prepared for stuffing, successively shirring them on the mandrel in the manner described with the latter casing, the last casing to be shirred being provided with a hole in the casing wall near one end only and shirred on the mandrel through said hole, the mandrel passing through the other end of the casing, and connecting together the adjacent end portions of the various casings hanging down from the mandrel, so that all the casings shirred on the mandrel constitute one continuous unit adapted to be properly preserved and readily used.

2. The method of preparing sausage casings for stuffing, which consists in tearing a hole in the wall of a casing near one end thereof, shirring the casing through its other end on a mandrel and passing the mandrel through said hole of the casing wall, the end portion of the casing hanging thus down from the mandrel, tearing a hole in the wall of another casing near each end thereof, shirring the casing through said holes on the mandrel, the end portions of the casings hanging thus down from the mandrel, tearing holes in the ends of further casings desired to be prepared for stuffing, successively shirring them on the mandrel in the manner described with the latter casing, the last casing to be shirred being provided with a hole in the casing wall near one end only and shirred on the mandrel through said hole, the mandrel passing through the other end of the casing, and knotting together the adjacent end portions of the various casings hanging down from the mandrel, so that all the casings shirred on the mandrel constitute one continuous unit adapted to be properly preserved and readily used.

3. The method of preparing sausage casings for stuffing, which consists in tearing a hole in the wall of a casing near one end thereof, shirring the casing through its other end on a mandrel and passing the mandrel through said hole of the casing wall, the end portion of the casing hanging thus down from the mandrel, tearing a hole in the wall of another casing near each end thereof, shirring the casing through said holes on the mandrel, the end portions of the casings hanging thus down from the mandrel, tearing holes in the ends of further casings desired to be prepared for stuffing, successively shirring them on the mandrel in the manner described with the latter casing, the last casing to be shirred being provided with a hole in the casing wall near one end only and shirred on the mandrel through said hole, the mandrel passing through the other end of the casing, connecting together the adjacent end portions of the various casings hanging down from the mandrel, so that all the casings shirred on the mandrel constitute one continuous unit adapted to be properly preserved and readily used, shirring the unit of casings when to be used under water on an auxiliary mandrel, and sliding the unit of casings in one movement from said auxiliary mandrel on to the stuffer horn of a sausage stuffing machine.

4. An article of the class described, comprising a plurality of sausage casings to be stored upon a storage mandrel, said casings near their ends being provided with holes to permit the mandrel to pass through and being connected to one another at their ends to form one continuous string, whereby the casings are adapted to be disposed in shirred condition upon the mandrel.

FRITZ FRIEDLER.